United States Patent [19]
Finley et al.

[11] Patent Number: 5,501,895
[45] Date of Patent: Mar. 26, 1996

[54] FLOOR COVERING UNDERLAYMENT

[76] Inventors: Brenda L. Finley, 1018 Donegal Springs Rd., Mount Joy, Pa. 17552; Ralph W. Wright, Jr., 303 Donna Ave., Lancaster, Pa. 17603

[21] Appl. No.: 917,845

[22] Filed: Jul. 23, 1992

[51] Int. Cl.⁶ .............................. B32B 23/02; B32B 3/06; B32B 5/14
[52] U.S. Cl. .............. 428/194; 428/71; 428/95; 428/306.6; 428/308.4; 428/309.9; 428/310.5; 428/316.6
[58] Field of Search .................. 428/71, 306.6, 428/308.4, 309.9, 310.5, 316.6, 95, 194

[56] References Cited

U.S. PATENT DOCUMENTS

| | | | |
|---|---|---|---|
| 3,785,913 | 1/1974 | Hallamore | 428/71 |
| 3,980,511 | 9/1976 | Proucelle | 156/62.4 |
| 4,160,060 | 7/1979 | Bynum, Jr. | 428/71 |
| 4,279,958 | 7/1981 | Ahmad | 428/311.5 |
| 4,418,108 | 11/1983 | Lin | 428/306.6 |
| 4,500,591 | 2/1985 | Peltier et al. | 428/251 |
| 4,522,857 | 6/1985 | Higgins | 428/95 |
| 4,557,774 | 12/1985 | Hoopengardner | 428/95 |
| 4,575,886 | 3/1986 | Larson | 428/306.6 |
| 4,647,484 | 3/1987 | Higgins | 428/95 |
| 5,080,944 | 1/1992 | Kauffman et al. | 428/47 |

FOREIGN PATENT DOCUMENTS 2218438  11/1989  United Kingdom ................ 428/308.4

OTHER PUBLICATIONS

Federal Test Method Standard No. 501a, Jun. 15, 1966; "Floor Coverings, Resilient, Nontextile Sampling and Testing", 7 pages.
"Quiet–Cor⁽ᴿ⁾ Underlayment", technical advertising brochure published by Tarkett, Inc. (no date) 2 pages.
Mondo advertising brochure describing Mondo underlayment product.
"Technical Specifications Mondo Everlay⁽ᴿ⁾" (English translation of above).

*Primary Examiner*—George F. Lesmes
*Assistant Examiner*—Terrel Morris

[57] ABSTRACT

A flooring installation is characterized by installing an underlayment between the flooring material and the subfloor. The underlayment includes (from the subfloor up) a foamed polymeric layer and a glass fiber mat. The foamed polymer interpenetrates at least the lower portion of the glass mat. The upper portion of the glass fiber mat is preferably unsaturated. The glass mat may have an acrylic latex tie coat opposite the foamed polymer layer.

11 Claims, 1 Drawing Sheet

FLOOR COVERING UNDERLAYMENT

FIELD OF INVENTION

The invention relates to floor covering underlayments and floor covering systems including floor covering underlayments. In particular, the invention is directed to floor covering underlayments which include a deformation resisting layer disposed above an energy absorbing layer.

BACKGROUND OF THE INVENTION

Surface coverings that serve as flooring materials are well known. Flooring is installed over a wide variety of subfloors, ranging from concrete to layers of plywood to old flooring material. When flooring, particularly resilient flooring, is installed over concrete its performance in the area of impact resistance is substantially less than when it is installed over plywood. The performance over particle board, flake board, etc. falls between the extremes.

Even when installed over a plywood subfloor, wood underlayments such as Masonite are typically used between the flooring and subfloor to hide subfloor irregularities. This may actually diminish the impact resistance of the flooring. Wood underlayments would improve the impact resistance of flooring installed over concrete subfloors but they are impractical for that application.

In addition, flooring materials, particularly vinyl-backed flooring materials, are subject to staining which migrates from the subfloor (or wood underlayment) and into the backing to mar the face. The vinyl-backed flooring materials are unlikely to provide substantial comfort, warmth or sound-deadening because of gauge limitations related to processing, packaging, handling, for example.

Flooring underlayments are presently in the market. Soniflor of Thailand and Tarkett (Quiet-Cor) in the USA sell felt and foam underlayments. Quiet-Cor is used as a sound deadening medium for tile installations over concrete. Both of these products share a common shortcoming . . . the felt. Felt provides less resistance to damage (flexing, indent, impact), poorer heat and moisture dimensional stability, and less structural integrity than the present structure. Further, felt provides sites for staining microbe growth which are not available in a non-felt structure.

Another underlayment which is presently sold is Everlay B produced by Mondo of France. This product does have sound deadening and insulating properties and could be used to improve the durability of flooring products in a similar manner to the present structure. However, it is less desirable for several reasons: (1) its overall gauge (ca 180 mils) renders it incompatible with most residential situations, i.e. it is much thicker than would be desirable; (2) its cost is prohibitively high for most residential jobs; (3) it has a tendency to curl when interflex floors such as Armstrong's Solarian Select are adhered to it; and (4) it exhibits poor residual indentation.

SUMMARY OF THE INVENTION

An object of the invention is to provide a floor covering underlayment which improves the performance and durability of the overlying floor covering while avoiding the limitations of the prior art underlayments.

Another object is to provide a floor covering underlayment which, when installed over any subfloor and under the flooring material, reduces the need for subfloor preparation, provides improved impact resistance (without sacrificing residual indentation resistance), promotes resistance to staining from the bottom up, and enhances warmth, comfort and sound deadening properties.

The above objects are accomplished in an underlayment which comprises a deformation resisting layer disposed above an energy absorbing layer. In one preferred embodiment the deformation resisting layer is an inorganic fiber layer and the energy absorbing layer is a foamed polymeric layer. Preferably, the foamed polymer interpenetrates the lower portion of a glass mat; however, the upper portion of the glass mat is not saturated with plastisol or the foamed polymer. The underlayment may include a tie coat opposite the foamed polymer layer.

DETAILED DESCRIPTION OF THE INVENTION

Figure 1:
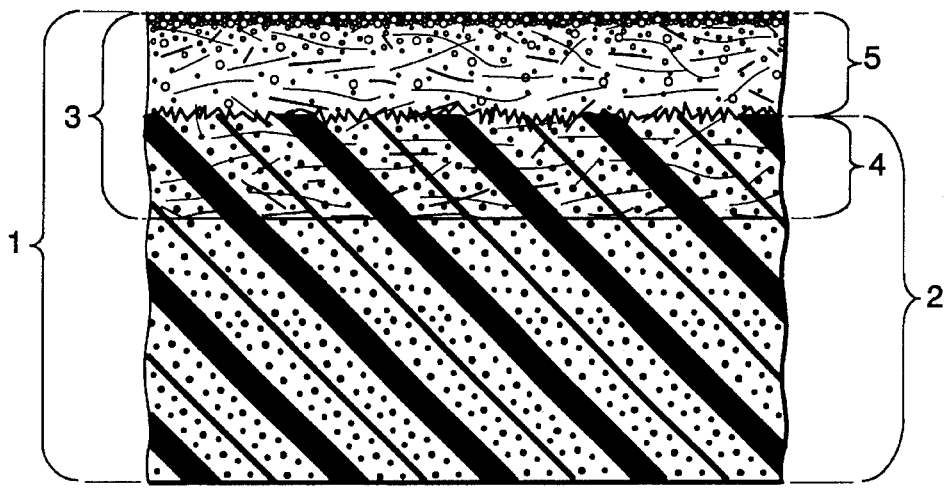
FIG. 1 is a cross-sectional view of the floor covering underlayment of the present invention.
Figure 2:
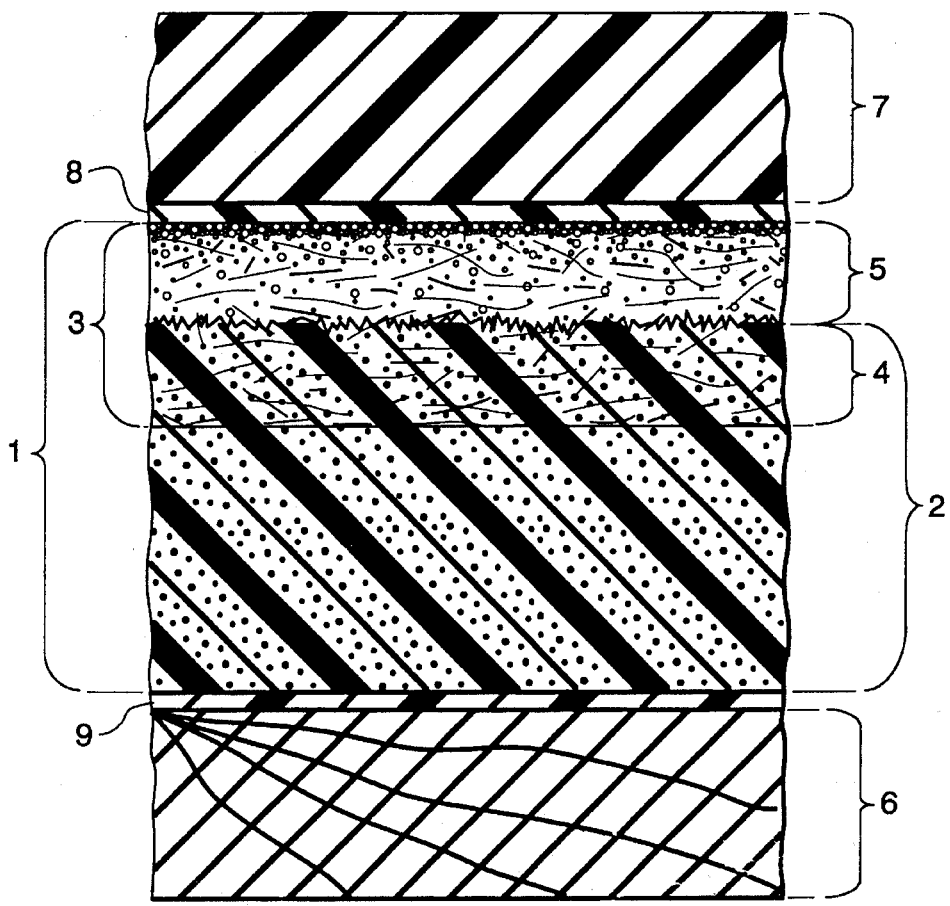
FIG. 2 is a cross-sectional view of the resilient floor covering system of the present invention.

The present invention provides a floor covering underlayment 1, shown in FIG. 1 which comprises a foamed polymer layer 2 and an inorganic fiber layer 3. Preferably, the underlayment includes a zone of interpenetration 4 of the foamed polymeric layer and the inorganic fiber. In one preferred embodiment, the inorganic fiber is a glass mat. Also, the glass mat may be coated with a tie coat 5 such as an acrylic latex after the polymeric layer is foamed. The acrylic latex migrates to the upper surface of the foamed polymer; however, the acrylic latex is concentrated at the exposed upper surface of the inorganic fiber layer. As shown in FIG. 2, the underlayment 1 is installed between the subfloor 6 and the floor covering 7 by adhesive layers 8 and 9.

The underlayment, when installed, forms part of a floor covering system in which the subfloor may be anything from concrete to an old floor material to materials such as particle board, flake board, strand board, etc. The sheet flooring material which overlies the underlayment can be any of a variety of structures. Although felt-backed products benefit least from this underlayment, their performance can be enhanced if they contain enough vinyl. By and large, vinyl-backed flooring structures work best with the underlayment.

The installation of the underlayment can be accomplished with full-spread adhesive, perimeter bonding, or loose lay and modified loose lay techniques depending on the subfloor characteristic and the inclination of the installer. The lamination of the flooring sheet goods on the underlayment can be by perimeter bonding, full-spread adhesion, or modified loose lay.

Full spread adhered vinyl flooring to the underlayment which is full spread adhered to the subfloor provides the maximum resistance to damage when moving heavy objects, but is most time consuming to install and most expensive to install. Perimeter bonded or modified loose lay of the flooring to the underlayment which is full spread adhered to the subfloor is appropriate for most situations. However, while less time consuming than full spread/full spread described above, it is less resistant to damage when moving heavy objects.

Perimeter bonded/modified loose lay flooring to the underlayment which is perimeter bonded/modified loose laid to the subfloor is the least time consuming and least expensive. It is appropriate in areas with no heavy objects and over subfloors with less than 0.18% seasonal change in dimension. Full spread adhered vinyl flooring to the underlayment which is loose laid is the easiest to remove and less time consuming and less expensive than full spread/full spread.

If the flooring/underlayment floor covering system has a bending stiffness of at least 10 inch-pounds, it will resist doming and damage due to moving heavy objects. However, to be able to roll up a resilient flooring sheet, it cannot have a bending stiffness of 10 inch-pounds. The present system in which the flooring sheet and underlayment each have a bending stiffness of less than 10 inch-pounds can be combined to form a flooring system with a bending stiffness of at least 10 inch-pounds.

The glass mat, which also serves as the carrier during processing, may be entirely glass fibers or may have an organic fiber component (such as polyester fiber). It must have at least a 5 pli (pounds per lineal inch) hot tensile strength (370° F.) and be sufficiently dense to permit the coating of a 6000–20,000 cp plastisol (with 15,000 cp being preferred) on it without complete strike through and with a nominal strike through of ca 50% of the mat's overall gauge which may vary from about 10 to about 40 mils.

To deter bottom up staining, it is important that the fiber layer be inorganic and at least 10 mils in thickness, preferably at least 20 mils. Organic fibers provide sites for staining microbe growth. If the thickness is less than 10 mils, it is difficult to maintain a strike through of the plastisol to no more than 50%. The unsaturated portion of the inorganic fiber layer provides a barrier to staining microbes. Of course, if bottom up staining is not a concern, the fiber layer could be organic and the plastisol could completely saturate the layer.

Any of a number of binders can be used to hold the glass mat together, eg. urea-formaldehyde, styrene-butadiene, etc., but acrylic binders are preferred. The fiber diameter can vary over a wide range, i.e. mats with fiber diameters of less than 9 microns will work, but fibers of less than 9 microns and greater than 3.5 microns are most desirable.

The tie coat can be any polymeric material which will tie the ends of the fibers down and deter adhesive from migrating into the unsaturated portion of the inorganic fiber layer. Acrylic tie coats which may be used can be any of a wide variety of moderately soft acrylic latexes. Rohm and Haas' AC-2045, AC-630, HA-12 and AC-1822 have been found to work well. The tie coat can be applied at a rate of 0 to 0.5 lb/sq yd, with an optimum range of 0.1 to 0.3 lb/sq yd.

The plastisol used to produce the foamed polymeric layer may encompass a wide range of formulations depending on the balance of cost and performance desired. A wide range of dispersion resins, blending resins, fillers, plasticizers, and stabilizers will work. The filler content can vary from 0 to 80 phr; the blending resin content can vary from 4 to 50 phr; the plasticizer content can vary from 30 to 50 phr. The amount of solid vinyl used to produce the underlayment can range from 10–70 mils, with the optimum for most residential applications being 30 to 40 mils.

The blow ratio can range from 1:1 to 3:1 with the optimum result obtained between 1.2:1 to 2:1. A blow ratio of greater than 3:1 increases residual indent.

EXAMPLE 1

This example illustrates a method for producing the present underlayment, an application including subfloor and flooring material, various tested sample configurations using that flooring material, and empirical test results. On the binder rich side of a glass mat (nominally 25 mils thick using 7.5 micron fibers and acrylic binder) 37 mils (wet gauge) of a foamable plastisol was coated with a reverse roll coater and subsequently gelled, fused and expanded for 1.2 minutes in a heat tunnel at 370° F. (heat tape) to produce a structure with a ca 80 mils overall gauge and a zone of interpenetration of the foam plastisol and glass mat ca 15 mils thick. In a second line pass, an acrylic tie coat (Rohm and Haas' AC-1822) was applied at a rate of 0.2 lb/sq yd to bind the fibers on the surface and beneath into an essentially unitary matrix.

Foam Formulation:

| Ingredient | PHR |
| --- | --- |
| Pliovic M-70, PVC blending resin (Goodyear Chemicals) | 40.0 |
| FPC 625, PVC dispersion resin (Occidental Chemical) | 60.0 |
| Limestone, 325 mesh, filler | 70.0 |
| ZnO, blowing agent initiator | .5 |
| Kempore AF, azo-bis formamide blowing agent (Kempore) | 2.0 |
| ESO, epoxidized soya oil, stabilizer | 1.5 |
| TxIb, texanol isobutyrate, secondary plasticizer | 7.0 |
| DOP, dioctyl phthalate, plasticizer | 10.0 |
| BBP (S-160), butyl benzophthalate (Monsanto) | 25.0 |
| 15% BaNeodecanate, stabilizer | 4.0 |
| Hydrocarbon solvent, diluent | 5.0 |

The underlayment was installed full spread over an old floor/concrete subfloor with Armstrong's S-580 water-based acrylic latex adhesive (the adhesive having been applied with a 9", short-nap paint roller) and an interflex product (Armstong's Solarian Select, overall gauge ca 75 mils with 10 mils of wear layer) was perimeter bonded over the underlayment by trowelling on Armstrong's S-665 solvent-based adhesive.

As a comparison test, a section of the Solarian Select flooring was perimeter bonded directly to the old subfloor. It was noted by the people on site upon completion of the installation that ambulating and standing on the areas employing underlayment was considerably more comfortable than the areas without the underlayment.

Sound deadening testing of this structural composite over New York standard subfloor yielded an IIC rating of 53; over California standard subfloor the result was an IIC rating of 56. A typical IIC rating for Solarian Select alone over the California subfloor is 52–53. Therefore, the sound deadening property of the underlayment is substantial.

When this structural composite was laid over a concrete subfloor (the worse case) and subjected to the impact of a 13 oz simulated "can" dropped from a height of 35", some slight surface marring resulted. When the underlayment was eliminated from the structure and Solarian Select was tested alone over concrete, the "can" cut completely through the flooring.

When asphalt driveway sealer was smeared on a piece of plywood subfloor and Solarian Select was "installed" with S-665 and aged at 115° F., a stain appeared at the surface in less than one week. With the underlayment of Example 1 inserted between the flooring and the sealer coated plywood and adhered top and bottom with S-665, no staining was noted on the surface even after eight weeks at 115° F.

When a smooth, unembossed Solarian Select-like flooring material was full spread adhered to the underlayment with S-665 which had in turn been full spread adhered with S-665 to a deeply embossed tile, no telegraphing of the tile's embossing was seen on the surface of the Solarian Select-like flooring.

EXAMPLE 2

The residual indent of the Solarian Select/underlayment composite of Example 1 was compared to the residual indent of the Mondo Everlay B adhered to Solarian Select flooring. Using the test procedure of Federal Test Method Standard 501a, Methods 3221 and 3231, both samples were subjected to a 120 lb. weight on a 0.282" dia. tip. Gauge and indentation was measured with a 0.125" dia. tip. The reported residual indent is the average of the sample gauge less the thickness at the spot of indentation after recovery. The residual indent for the Example 1 composite was 0.007 inches while the residual indent for the Mondo composite was 0.014 inches. When the application time of the weight was increased to 10 minutes, the residual indent for the Example 1 composite was 0.015" and the residual indent for the Mondo composite was 0.039".

The residual indentation of the Mondo underlayment and the Example 1 underlayment alone were measured by the above procedure. The residual indent for Example 1 was 0.007" and the residual indent for the Mondo underlayment was 0.039. When the application time of the weight was increased to 10 minutes, the residual indent for the Example 1 underlayment was 0.013" and the residual indent for the Mondo composite was 0.038". A residual indent of the underlayment of greater than 0.020" for the underlayment leads to an unsatisfactory floor covering. Therefore, the residual indent of the underlayment should be 0.025" or less, preferably 0.020" or less, and most preferably 0.015" or less.

EXAMPLE 3

The underlayment of Example 1 was installed full spread over an old floor/plywood subfloor using Armstrong's S-575 water-based latex adhesive for one half of the room and Henry's S-630 water-based acrylic adhesive for the other half of the room (the adhesive having been applied with a fine notch trowel) and an interflex product (Armstong's Solarian Select) was perimeter bonded over the underlayment with Armstrong's S-665 adhesive.

The owner in this installation also commented on how comfortable it was to walk on this flooring system. The owner in this case has a job which involves standing all day so he was especially sensitive to comfort considerations.

EXAMPLE 4

The underlayment of Example 1 was installed full spread over a ply-wood subfloor using Armstrong's S-280 water-based latex adhesive and an interflex product (Armstrong's Visions Solarian, with an overall gauge of 90 mils and 18 mils of wear layer) was perimeter bonded over the underlayment with Armstrong's S-665 adhesive.

EXAMPLE 5

An underlayment was produced in the manner described in Example 1 above except that the glass mat used was 10 mils thick, the fibers were a blend of 6.5 micron and sub-3.5 micron fibers, and the binder was urea-formaldehyde. The underlayment exhibited an interpenetration of less than 5 mils.

EXAMPLE 6

An underlayment was produced in the manner described in Example 1 above except that the glass mat used was 30 mils thick, and was made using 6.5 micron fibers and acrylic binder. It exhibited an interpenetration of about 17 mils.

EXAMPLE 7

An underlayment was produced in the manner described in Example 1 above except that the glass mat used was 20 mils thick, and was made using a blend of 6.5 micron glass fibers and 10% polyester fibers. The binder was an acrylic binder. It exhibited an interpenetration of about 13 mils.

EXAMPLE 8

An underlayment was produced in the manner described in Example 1 above except that the glass mat used was 22 mils thick, and was made using 9 micron glass fibers and acrylic binder. It exhibited an interpenetration of about 16 mils.

EXAMPLE 9

An underlayment was produced in the manner described in Example 1 above except that the glass mat used was 15 mils thick, and was made using 9 micron glass fibers and acrylic binder. It exhibited an interpenetration of about 12 mils.

EXAMPLE 10

An underlayment was produced in the manner described in Example 1 above except that the glass mat used was 14 mils thick, and was made using 7.5 micron glass fibers and acrylic binder. It exhibited an interpenetration of about 9 mils.

EXAMPLE 11

An underlayment was produced in the manner described in Example 1 above except that the glass mat used was 21 mils thick, and was made using 7.5 micron glass fibers and acrylic binder. It exhibited an interpenetration of about 13 mils.

EXAMPLES 12–15

The same as Examples 8–11 above except that the binder type was styrene-butadiene rubber and the plastisol strike through was nearly through the mat.

EXAMPLE 16

An underlayment was produced in the manner described in Example 1 above except that the glass mat used was 25 mils thick, and was made using a 50/50 blend of 6.5 micron glass fibers and polyester fibers. The binder was styrene-butadiene rubber. It exhibited an interpenetration of about 13 mils.

EXAMPLE 17

An underlayment was produced in the manner described in Example 1 above except that the plastisol used had 40 phr of filler and 30 phr of plasticizer. The interpenetration was about 13 mils.

EXAMPLE 18

An underlayment was produced in the manner described in Example 1 above except that the plastisol used had 80 phr of filler and 40 phr of plasticizer. The interpenetration was about 11 mils.

EXAMPLE 19

An underlayment was produced in the manner described in Example 1 above except that the tie coat used was Rohm and Haas' AC-630.

EXAMPLE 20

An underlayment was produced in the manner described in Example 1 above except that the tie coat used was Rohm and Haas' HA-12.

We claim:

1. A floor covering system comprising an underlayment, an adhesive and a resilient flooring sheet, the underlayment being adhered to the flooring sheet by the adhesive, the underlayment comprising a fiber layer of at least about 10 mils in thickness and a foamed polymeric layer, the fiber layer having at least a 5 pound per lineal inch hot tensile strength, a portion of the foamed polymeric layer interpenetrating a portion of the fiber layer adjacent the foamed polymeric layer.

2. The floor covering system of claim 1 wherein the underlayment is perimeter bonded to a subfloor.

3. The floor covering system of claim 1 wherein the floor covering is full spread adhered to the underlayment by the adhesive.

4. The floor covering system of claim 1, wherein the floor covering is a flooring sheet, the flooring sheet having a bending stiffness of less than 10 inch-pounds, the underlayment having a bending stiffness of less than 10 inch-pounds, and the bending stiffness of the floor covering system being at least 10 inch-pounds.

5. The floor covering system of claim 1, wherein the fiber layer of the underlayment is adjacent the resilient flooring sheet.

6. A floor covering system comprising an underlayment, an adhesive and a flooring sheet, the flooring sheet being perimeter bonded to the underlayment by the adhesive, the underlayment comprising an inorganic fiber layer of at least about 10 mils in thickness and a foamed polymeric layer, the inorganic fiber layer having at least a 5 pound per lineal inch hot tensile strength, a portion of the foamed polymeric layer interpenetrating a portion of the fiber layer adjacent the foamed polymeric layer.

7. The floor covering system of claim 6, wherein the fiber layer of the underlayment is adjacent the flooring sheet.

8. A resilient floor covering system comprising an underlayment, an adhesive and a resilient flooring sheet, the underlayment being adhered to the flooring sheet by the adhesive, the underlayment comprising an inorganic fiber layer having at least a 5 pound per lineal inch hot tensile strength and a polymeric layer, a portion of the polymeric layer interpenetrating a portion of the fiber layer adjacent the polymeric layer, the flooring sheet comprising an inorganic fiber layer.

9. The floor covering system of claim 8 wherein the inorganic fiber layer of the underlayment is at least about 10 mils in thickness.

10. The floor covering system of claim 8, wherein the fiber layer of the underlayment is about 10 mils to about 40 mils in thickness.

11. The floor covering system of claim 8, wherein the fiber layer of the underlayment is adjacent the resilient flooring sheet.

* * * * *